United States Patent

Tezuka et al.

[11] Patent Number: 4,716,999
[45] Date of Patent: Jan. 5, 1988

[54] SYSTEM FOR CONTROLLING A LOCK-UP SYSTEM OF AN AUTOMATIC TRANSMISSION FOR A MOTOR VEHICLE

[75] Inventors: Kazunari Tezuka, Asaka; Mitsuo Nakamura, Tokyo, both of Japan

[73] Assignee: Fuji Jukogyo Kabushiki Kaisha, Tokyo, Japan

[21] Appl. No.: 816,098

[22] Filed: Jan. 3, 1986

[30] Foreign Application Priority Data

Jan. 10, 1985 [JP] Japan ................................ 60-2922

[51] Int. Cl.⁴ ........................ F16D 47/02; B60K 41/02
[52] U.S. Cl. ................................ 192/3.29; 192/0.084; 192/0.096
[58] Field of Search ................ 192/0.04, 0.048, 0.052, 192/0.062, 0.08, 0.084, 0.092, 0.096, 3.28, 3.29, 3.3, 3.31; 74/858, 860

[56] References Cited

U.S. PATENT DOCUMENTS

| | | | |
|---|---|---|---|
| 2,728,427 | 12/1955 | Lucia | 192/0.033 |
| 3,001,415 | 9/1961 | Smirl | 74/846 |
| 3,382,956 | 5/1968 | Henry-Biabaud | 192/0.08 |
| 3,693,478 | 9/1972 | Malloy | 74/731 |
| 4,355,550 | 10/1982 | Will et al. | 74/858 |
| 4,448,293 | 5/1984 | Maeda | 192/3.31 |
| 4,467,673 | 8/1984 | Hamada et al. | 192/0.096 |
| 4,509,124 | 4/1985 | Suzuki et al. | 192/3.28 |
| 4,512,212 | 4/1985 | Ishikawa | 192/0.052 |

FOREIGN PATENT DOCUMENTS 174749 10/1983 Japan ................................ 74/858

Primary Examiner—Rodney H. Bonck
Assistant Examiner—David A. Testardi
Attorney, Agent, or Firm—Martin A. Farber

[57] ABSTRACT

An intake air control valve controls the amount of intake air of an engine. When a torque converter of an automatic transmission is locked for establishing the lock-up state, the control valve is closed to reduce the amount of air, so that engine speed is reduced without increasing the engine torque.

2 Claims, 7 Drawing Figures

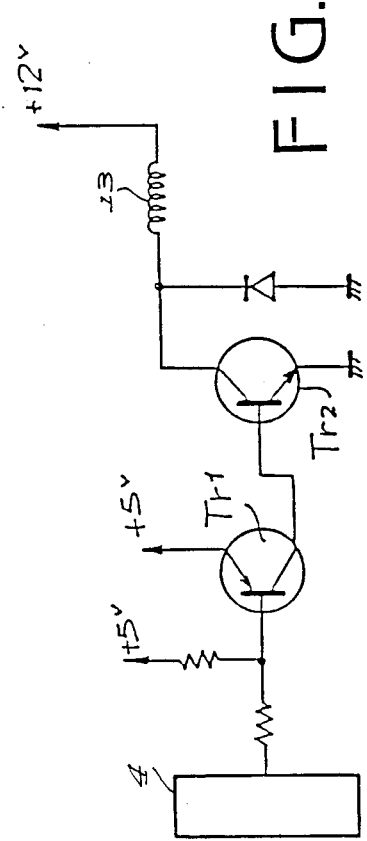
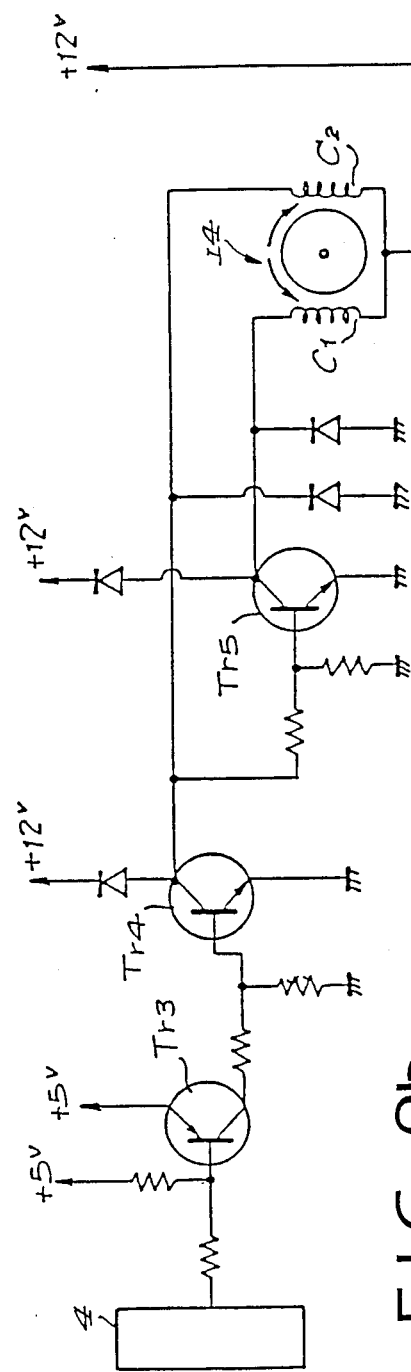

SYSTEM FOR CONTROLLING A LOCK-UP SYSTEM OF AN AUTOMATIC TRANSMISSION FOR A MOTOR VEHICLE

BACKGROUND OF THE INVENTION

The present invention relates to a system for controlling a lock-up system of an automatic transmission for a motor vehicle.

In the automatic transmission having a lock-up system, when a torque converter provided in the transmission is locked up by the lock-up system, the torque of an engine may tend to change. FIG. 5a shows a torque curve of an engine showing the relationship between torque and engine speed. When the torque converter is locked up, the torque converter is prevented from slipping, so that engine load increases. As a result, engine speed slows down. For example, if the torque converter is locked up at an engine speed A in FIG. 5a, the engine speed slows down to a speed B by $\Delta NE$. On the other hand, engine torque increases from D to C by $\Delta T$. Further, the power of the engine also increases as shown in FIG. 5b. In FIG. 5b, the solid line S shows the power in the lock-up state with respect to vehicle speed, and the dotted line L shows the power in the torque converter operating state (non-lock-up state). When the torque converter is locked up at a vehicle speed (about 45 Km/h), the power increases by $\Delta F$. By such increases of engine torque and power, the vehicle is unnecessarily accelerated, which gives an unpleasant feeling to the driver.

In order to eliminate such a defect, Japanese Patent Laid Open No. 58-42861 provided a system which operates to delay of the locking up of the torque converter until the engine output becomes stable. However, such a system reduces the driveability of the vehicle.

SUMMARY OF THE INVENTION

The object of the present invention is to provide a system which may prevent an increase of engine torque at locking of a torque converter without delaying the locking operation, thereby improving the driveability of a motor vehicle.

In accordance with the present invention, an intake air control valve is provided for controlling the amount of intake air of an engine. When a torque converter is locked, the control valve is closed to reduce the amount of air, so that the engine speed is reduced without increasing the engine torque.

In the system of the present invention, sensing means is provided for sensing driving conditions of the motor vehicle and for producing a driving condition signal, and control means responds to the driving control signal to produce an output signal in a lock-up condition state. A solenoid operated control valve is provided to respond to the output signal for applying fluid to a lock-up clutch to engage it, and valve means also responds to the output signal to decrease the amount of intake air of an engine so as to prevent an increase of engine torque.

The other objects and features of this invention will become understood from the following description with reference to the accompanying drawings.

BRIEF DESCRIPTION OF DRAWINGS

FIGS. 2a and 2b are circuits for driving actuators, respectively;

DETAILED DESCRIPTION OF THE PREFERRED EMBODIMENTS

Figure 1:
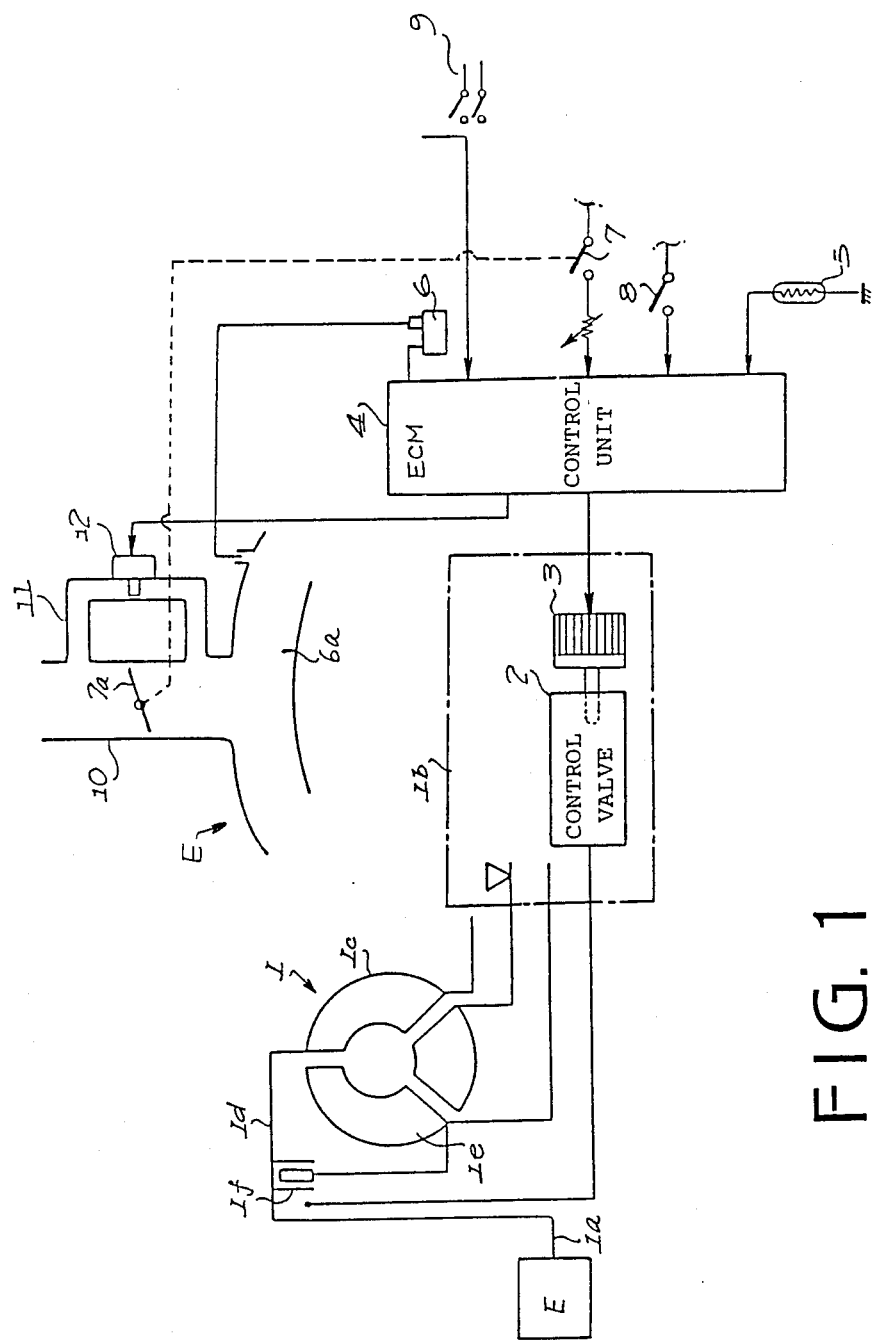
FIG. 1 is a schematic diagram showing a control system according to the present invention.

Referring to FIG. 1, a torque converter 1 is provided for transmitting the torque of a crankshaft 1a of an engine E to an automatic transmission 1b. The torque converter 1 comprises an impeller 1c connected to the crankshaft 1a through a housing 1d, a turbine 1e connected to an input shaft of the automatic transmission 1b, and a fluid operated lock-up clutch 1f for coupling the housing 1d to the turbine 1e. The lock-up clutch 1f is applied with pressurized oil through a solenoid operated control valve 2 which is operated by a solenoid 3. The solenoid 3 is energized by an output of a control unit 4 comprising a microcoumputer.

The control unit 4 is applied with signals of a coolant temperature sensor 5, a manifold vacuum sensor 6 for sensing the vacuum in an intake manifold 6a of the engine E, and a throttle position sensor 7 for detecting the opening angle of a throttle valve 7a of the engine E. Further, a vehicle speed signal from a vehicle speed sensor 8, and a shift signal from a shift lever switch 9 which represents a shift lever of the automatic transmission at a driving position, are applied to the control unit 4. On the other hand, a bypass 11 is provided in a throttle body 10 around the throttle valve 7a, and an engine speed control valve 12 is provided in the bypass 11. In response to the input signals, the control unit 4 produces output signals at a condition proper to lockup the torque converter. The output signals are applied to the solenoid 3 and to the engine speed control valve 12 to engage the lock-up clutch 1f and to close the valve 12 so as to slightly decrease engine speed, as described hereinafter.

The engine speed control valve 12 is operated by an actuator such as a solenoid or a pulse motor. FIG. 2a shows a driving circuit for driving a solenoid 13 and FIG. 2b shows a driving circuit for a pulse motor 14. In the circuit of FIG. 2a, the control unit 4 produces ON OFF signals. When the control unit 4 produces an ON signal (high level signal), transistors $T_{r1}$ and $T_{r2}$ turn off, so that the solenoid 13 is de-energized to close the valve 12. Accordingly, engine speed decreases by reduction of the amount of intake air passing through the bypass 11. In the system of FIG. 2b, the control unit 4 produces pulses which turn a transistor $T_{r3}$ on and off. High level pulses turn off the transistor $T_{r3}$, causing a transistor $T_{r4}$ to go to OFF and a transistor $T_{r5}$ to go to ON. Accordingly, a current passes through a coil $C_1$ of the pulse motor 14 and the transistor $T_{r5}$ to operate the motor to reduce the opening degree of the control valve 12. When low level voltage is applied to the transistor $T_{r3}$, the conductive state of the circuit is inverted. Namely, the transistor $T_{r4}$ becomes conductive and the transistor $T_{r5}$ becomes nonconductive. Thus, the current passes through a coil $C_2$ and the transistor $T_{r4}$, thereby opening the valve 12. Accordingly, by changing the duty ratio of the pulses, the amount of intake air can be increased or decreased to control the engine speed. For example, at a high duty ratio, the valve 20 is closed, and at a low duty ratio, the valve 20 is opened.

Figure 4:
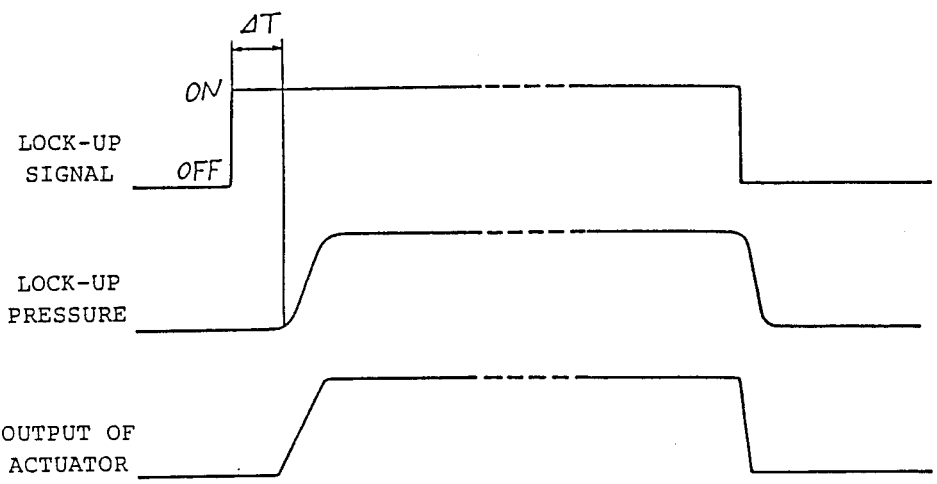
FIG. 4 is a time chart of the operation.
Figure 5A:
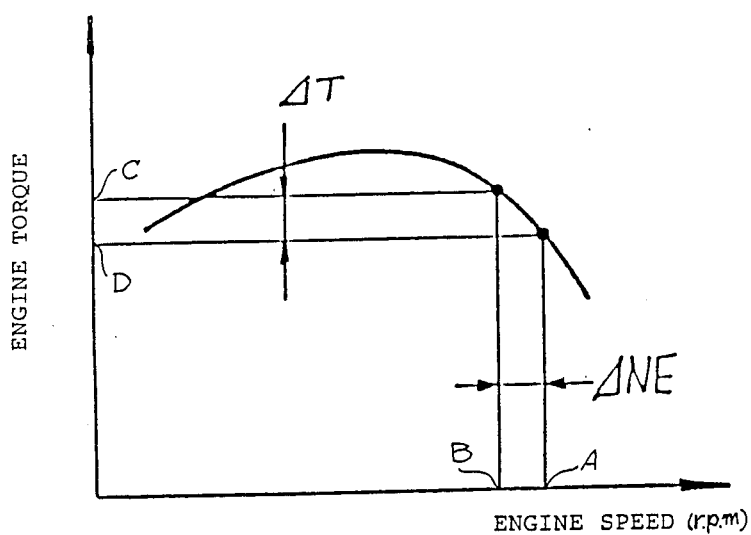
FIGS. 5a and 5b show changes of engine torque and power in an engine having a conventional lock-up system.
Figure 5B:
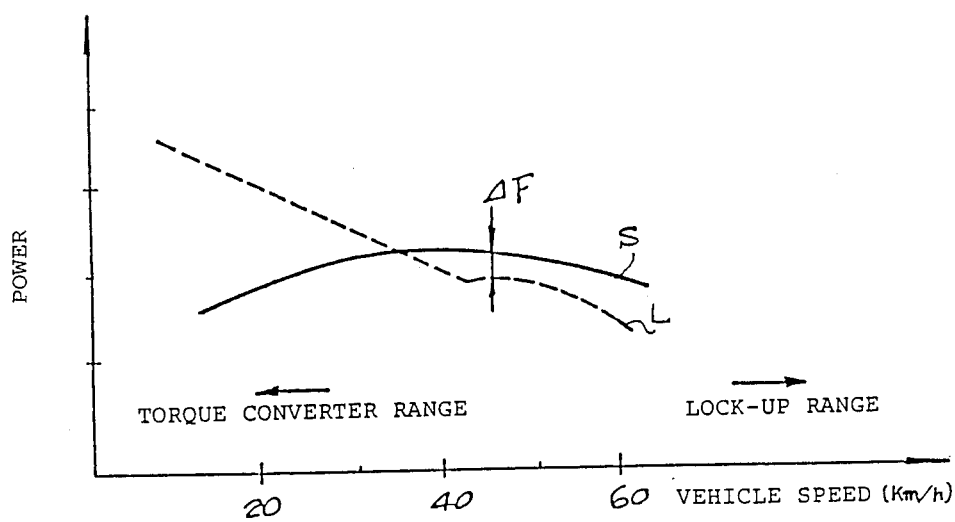

When driving conditions of the motor vehicle reach the lock-up state, the control unit produces a lock-up signal as shown in FIG. 4. The lock-up signal is applied to the solenoid 3 to energized it, so that the control valve 2 is opened. Further, an engine speed control signal, for example pulses having a high duty ratio, is applied to the engine speed control valve 12 to close the valve. At that time, if the opening degree of the throttle valve 7a and the vehicle speed are constant, the pressure of oil applied to the lock-up clutch 1f rises at the same time as the generation of the lock-up signal, and the output of the actuator of the control valve 12 increases immediately. If not, the pressure of the lock-up oil and the output of the actuator increases after a delay $\Delta T$ as shown in FIG. 4.

Figure 3:
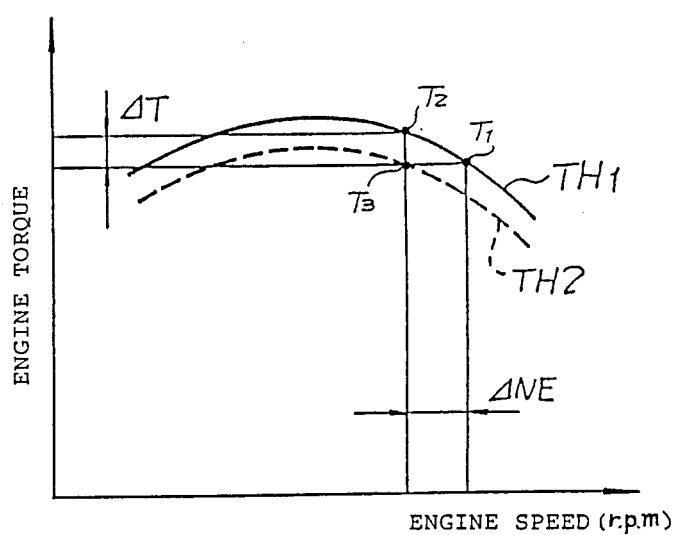
FIG. 3 is a graph showing the relationship between engine speed and engine torque for explaining the operation of the control system.

Referring to FIG. 3, if the lock-up signal and the engine speed control signal are generated at a torque $T_1$ on a torque curve $TH_1$ at a throttle opening degree $TH_1'$, engine speed decreases by NE because of an increase of engine load caused by engagement of the lock-up clutch 1f. As a result, the engine torque $T_1$ is to be increased to torque $T_2$. However, since the opening degree of the control valve 12 is reduced by the engine speed control signal, the torque curve $TH_1$ changes to a torque curve $TH_2$ corresponding to a small opening degree $TH_2'$ of the throttle valve because of the decrease of the amount of intake air. In accordance with the present invention, the torque curve is shifted to the $TH_2$ curve for producing the engine torque $T_3$ which is the same as the torque $T_1$. Thus, the engine speed reduces by $\Delta NE$ upon locking-up of the torque converter without increasing of the engine torque.

When the lock-up state is changed to the torque converter operating state, the engine speed control valve is opened by an engine speed control signal of duty a low ratio. Thus, engine speed increases without reducing the engine torque.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling a lock-up system of an automatic transmission for an engine powered vehicle having a torque converter, comprising:
   a fluid operated lock-up clutch for locking the torque converter;
   sensing means for sensing driving conditions of the motor vehicle and for producing a driving condition signal;
   control means responsive to the driving condition signal for producing an output signal in a lock-up condition state;
   a solenoid operated control valve responsive to the output signal for applying fluid to the lock-up clutch to engage the lock-up clutch; and
   valve means responsive to the output signal for reducing the amount of intake air of an engine of the vehicle in lock-up state so as to prevent changing of engine torque.

2. The system according to claim 1, wherein
   the sensing means includes a vehicle speed sensor and a throttle position sensor of a throttle valve of the engine.

* * * * *